United States Patent [19]

Yamamoto et al.

[11] Patent Number: 4,704,009

[45] Date of Patent: Nov. 3, 1987

[54] PROJECTION LENS

[75] Inventors: Yoshiharu Yamamoto, Toyonaka; Yoshito Miyatake, Neyagawa; Yasuo Nakajima, Ibaraki; Yoshitomi Nagaoka, Neyagawa; Syusuke Ono, Takatsuki, all of Japan

[73] Assignee: Matsushita Electric Industrial Co., Ltd., Osaka, Japan

[21] Appl. No.: 805,385

[22] Filed: Dec. 4, 1985

[30] Foreign Application Priority Data

Dec. 5, 1984 [JP] Japan .................. 59-256717

[51] Int. Cl.$^4$ .................. G02B 9/58; G02B 13/18; G02B 27/18
[52] U.S. Cl. .................. 350/432; 350/412; 350/469
[58] Field of Search .................. 350/432, 412, 469

[56] References Cited

U.S. PATENT DOCUMENTS 4,300,817 11/1981 Betensky .
4,348,081 9/1982 Betensky .
4,620,773 11/1986 Fukuda .................. 350/469

FOREIGN PATENT DOCUMENTS 0900090  9/1944  France .................. 350/469
57-108818  7/1982  Japan .
58-125007  7/1983  Japan .
58-198017  11/1983  Japan .
59-155818  9/1984  Japan .

Primary Examiner—John K. Corbin
Assistant Examiner—Rebecca D. Gass
Attorney, Agent, or Firm—Wenderoth, Lind & Ponack

[57] ABSTRACT

A projection lens having a large aperture ratio has 3 units for projecting an enlargemen of an image appearing on a CRT onto a screen. The first unit from the screen has a negative power so that the entrance pupil is moved toward the screen to thereby improve off-axis vignetting factor. The second unit consists of two positive power lens elements so that the positive power of the entire system is shared by the second unit and the temperature characteristic is improved by using a positive power glass lens element as one of the two positive power lens elements. The third unit has a negative power to correct curvature of field.

20 Claims, 18 Drawing Figures

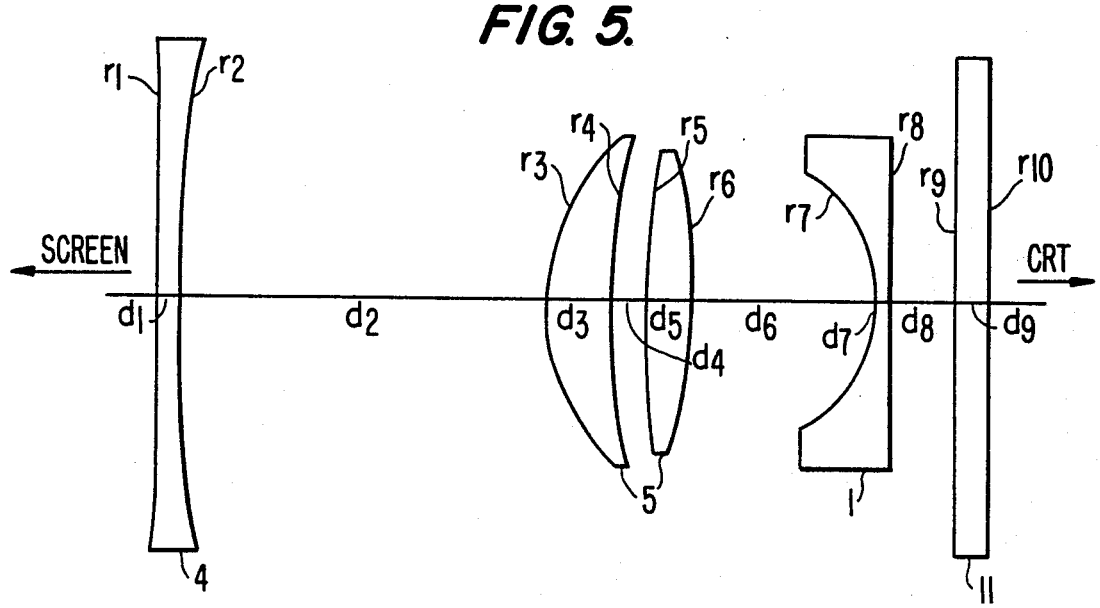
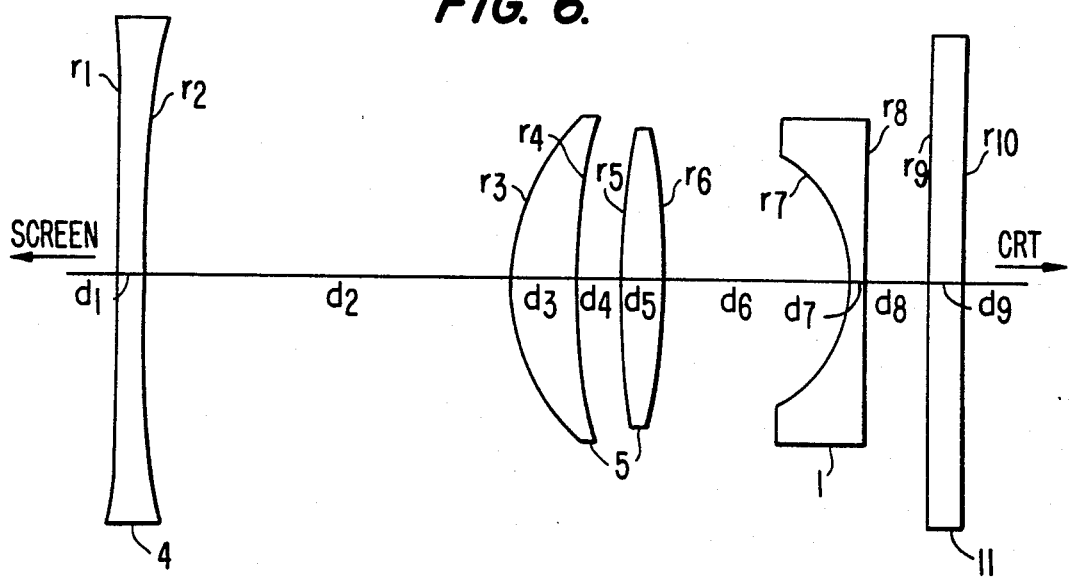
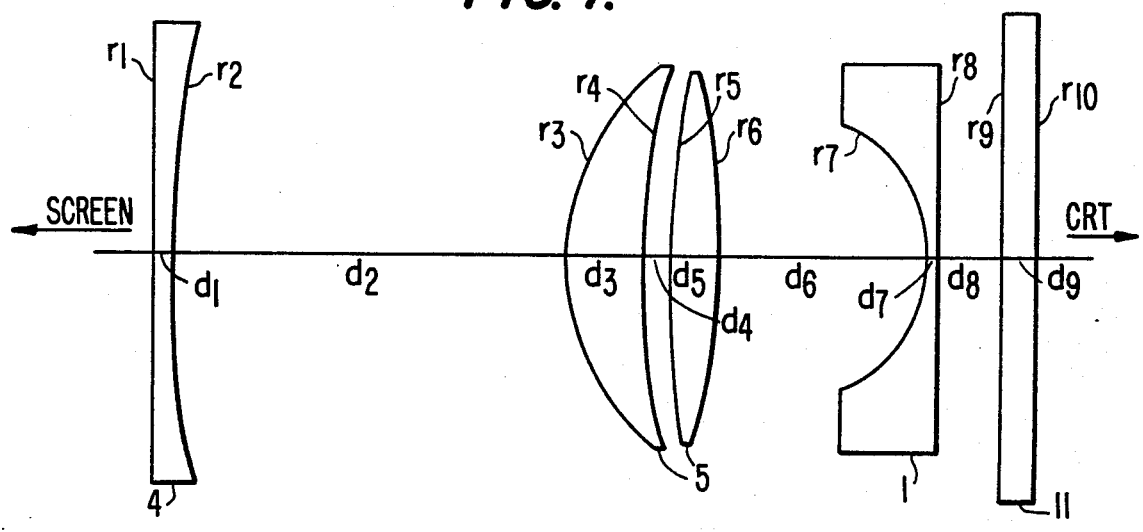

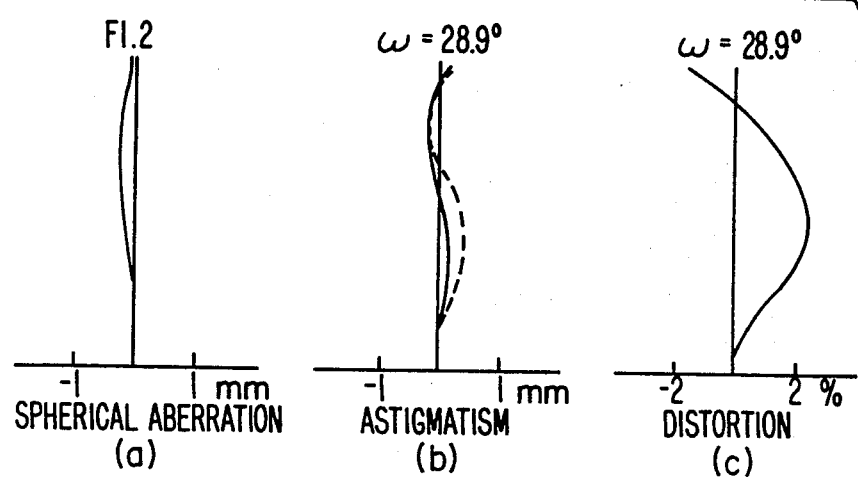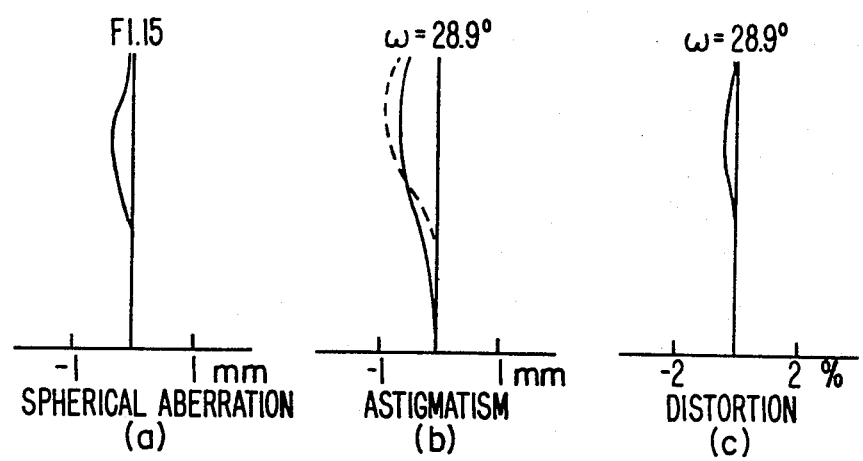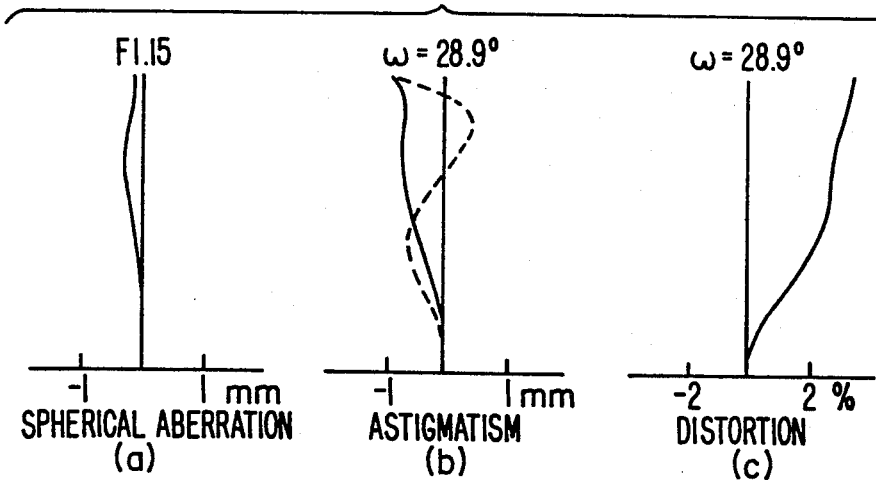

PROJECTION LENS

BACKGROUND OF THE INVENTION

1. Field of the Invention

The present invention relates to a projection lens, and more particularly to a projection lens for a video projector to obtain a large picture on a screen by projecting a cathode ray tube (CRT) image.

2. Description of the Prior Art

Projection lenses of a conventional type are comprised entirely of glass lenses or entirely of plastic lenses. U.S. Pat. No. 4,300,817 and Japanese Laid-Open Patent Application No. 57-108818 disclose projection lenses comprising 3-groups consisting of 3 lens elements. U.S. Pat. No. 4,348,081 and Japanese Laid-Open Patent Application No. 58-198017 disclose projection lenses comprising 3 groups consisting of 4 lens elements. If a lens is composed entirely of plastic lens elements, its focal point varies considerably due to changes in atmospheric temperature. Therefore hybrid projection lenses which are comprised of a combination of glass and plastic lens elements have been proposed. A hybrid projection lens comprising 3 groups consisting of 3 lens elements is disclosed in Japanese Laid-Open Patent Application No. 58-125007, and a hybrid projection lens comprising 3 groups consisting of 4 lens element is disclosed in Japanese Laid-Open Patent Application No. 59-155818. The hybrid projection lens is comprised, in sequence from the screen to the CRT, of a positive plastic lens, a positive meniscus glass lens, a positive meniscus plastic lens, and a negative plano-concave plastic lens.

However, in the conventional projection lens, because the first group from the screen has a positive power, the entrance pupil is located at a position inside the lens far from the lens tip at the screen, so that the off-axis light flux is considerably shaded. In other words, the image projected on the screen will lack the proper quantity of light at the periphery of the screen.

SUMMARY OF THE INVENTION

An object of the present invention is to reduce the shading of the off-axis light flux by bringing the entrance pupil closer to the lens tip at the screen thereby providing a projection lens which is improved to project an image having a more proper quantity of light at the periphery of the screen.

In order to achieve the above object, the projection lens of the present invention comprises, in sequence from the screen, a first lens group having a negative power and having at least one aspheric surface, a second lens group having a positive power and having at least one aspheric surface, and a third lens group having a negative power and having at least one aspheric surface with a stronger concave surface facing the screen.

By making the power of the first group negative, it is possible to bring the entrance pupil closer to the lens tip at the screen to thereby restrain the reduction of the quantity of light at the periphery of the screen. Further, by comprising the second group of a positive power plastic lens element and a positive power glass lens element, it also is possible to reduce weight and cost while maintaining high performance and yet to restrict the focal point variation due to temperature drift. With the above arrangement, a stable projected image of uniform brightness and high quality can be obtained.

BRIEF DESCRIPTION OF THE DRAWINGS

FIGS. 3 through 10 are side views showing first through eighth embodiments of projection lens according to the present invention; and FIGS. 11 through 18 respectively show characteristic curves of the first through eighth embodiments, in each of which (a), (b) and (c) respectively show spherical aberration, astigmatism and distortion.

DESCRIPTION OF THE PREFERRED EMBODIMENTS

Figure 1:
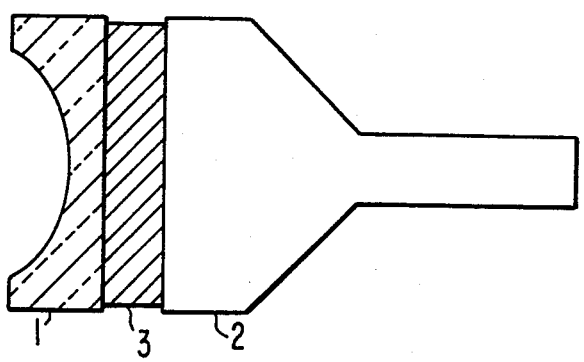
FIG. 1 is a schematic side view illustrating a medium disposed between the third lens group and the CRT face plate in an embodiment of the projection lens according to the present invention.

The projection lens according to the present invention will hereafter be explained concretely in connection with the preferred embodiments.

The projection lens according to the present invention comprises, in the sequence from the screen, a first lens group having a negative power, a second lens group having a positive power, and a third lens group having a negative power. The first group brings the entrance pupil closer to the lens tip, namely, the screen end, to reduce shading of the off-axis light flux and increase the quantity of light at the periphery of the screen by enhancing the vignetting factor. Furthermore, by making at least one surface of the first group to be aspheric, spherical aberration, coma, and distortion are corrected. The second group has a positive power contributing to image formation capability of the entire lens system, and has at least one aspheric surface to correct residual spherical aberration and coma. The third group has its stronger concave surface facing toward the screen and has at least one aspheric surface to correct curvature of the field and distortion.

In order to restrain the variation of the focal point caused by changes in atmospheric temperature while maintaining high image formation performance and to realize light weight and reduced cost, a more preferred projection lens according to the present invention comprises a first lens group comprising a negative power plastic lens element, a second lens group comprising a positive power plastic lens element and a positive power glass lens element, and a third lens group comprising a negative power plastic lens element with its strong concave surface facing the screen.

The variation in optical performance (due to the atmospheric temperature variation) of the negative power plastic lens elements in the first and third groups is counter-balanced by that of the positive power plastic lens element of the second group. Furthermore, since a substantial portion of the positive power of the second group is dominated by the positive power plastic lens element, the power of the glass lens element of the second group can be reduced thereby restraining increase in weight and cost.

The above described features of the projection lens according to the present invention can be improved further by satisfying the following conditions:

$$-0.1 < f/f_I < 0 \tag{1}$$

$$0.9 < f/f_{II} < 1.2 \tag{2}$$

$$-1.1 < f/f_{III} < -0.7 \quad (3)$$

where:

f: Focal length of the entire lens system
$f_I$: Focal length of the first group
$f_{II}$: Focal length of the second group
$f_{III}$: Focal length of the third group The condition (1) above specifies power distribution of the first group to the entire lens system. When the lower limit of condition (1) is exceeded, the burden of refractive power of the second group lens is increased, which in turn makes it difficult to correct coma in the vicinity of the maximum field angle, and increases the height of the on-axis light ray with respect to the second group and the effective diameter of the second group, resulting in a cost increase. When the upper limit of condition (1) is exceeded, the entrance pupil is moved away from the lens tip at the screen end, so that the quantity of light at the periphery of the screen becomes insufficient.

The condition (2) specifies power distribution of the positive second group to the entire lens system. When the lower limit of condition (2) is exceeded, the absolute value of the negative power of the first group is small, so that the quantity of light at the periphery of the screen is insufficient and the overall length of the entire lens system is long. When the upper limit of condition (2) is exceeded, spherical aberration generated at the second group is excessive, so that it is difficult to balance the spherical aberration with coma even if the first and second groups have aspheric surfaces.

The condition (3) specifies power distribution of the third group to the entire lens system. When the lower limit of condition (3) is exceeded, the Petzval sum excessive, so that astigmatism is deviated to positive. When the upper limit of condition (3) is exceeded, the Petzval sum is under corrected, so that the image field is under.

When the second group is composed of two positive power lens elements, the power is divided and the burden of power of each positive lens element is reduced to thereby improve aberration correction. In this case, it is desirable to satisfy the following condition:

$$0.55 < r_3/f < 0.85 \quad (4)$$

where $r_3$ is the radius of curvature to the screen end of the first positive power lens element from the screen end of the second group, and f is the focal length of the entire lens system. When either of the lower or upper limit of condition (4) is exceeded, it is difficult to correct and balance spherical aberration and coma.

Because plastic has a variation rate in refractive index due to temperature variation which is greater by one digit relative to that of glass, if all the lens elements are composed by plastic lens elements, a variation of atmospheric temperature causes a deviation of the focal point. To alleviate this, the second group consists of a hybrid structure comprising a plastic lens element and a glass lens element. The plastic lens element is used as a lens directed to the screen and having a high on-axis ray height, or, a greater effective diameter. The glass lens is used as a lens directed to the CRT end and having a low on-axis ray height or a smaller effective diameter. Accordingly, the resistance to the atmospheric temperature variation is improved, and cost and weight are reduced.

When the positive second group is comprised of, in sequence from the screen, a positive power plastic lens element having a focal length $f_2$ and a positive power glass lens element having a focal length $f_3$, it is desirable to satisfy the following condition:

$$0.55 < f_2/f_3 < 0.95 \quad (5)$$

The condition (5) specifies power distribution of the positive power plastic lens element and the positive power glass lens element comprising the second group. When the lower limit is exceeded, the power shared by the glass lens element is excessively small, resulting in an increase in to increase the focal point deviation due to the temperature variation which narrows the allowable atmospheric temperature range. When the upper limit is exceeded, the power shared by the glass lens element increases, making it difficult to correct spherical aberration and increasing the glass cost.

It is further desirable, providing that the distance between surfaces of the two positive power lens elements of the second group is $d_4$ and the radius of curvature at the third group end of the lens element at the third group end is $r_6$, to satisfy the following conditions:

$$d_4/f < 0.35 \quad (6)$$

$$-0.85 < f/r_6 < 0 \quad (7)$$

When the range of condition (6) is exceeded, the positive power of the second group increases, so that the Petzval sum deviates to positive thereby making correction of curvature of field difficult and increasing the lens length. When either the lower or upper limit of condition (7) is exceeded, it is difficult to correct and balance spherical aberration and coma.

When the distance between surfaces of the second group and the third group is $d_6$, it is desirable to satisfy the following condition:

$$0.3 < d_6/f < 0.9 \quad (8)$$

When the lower limit of condition (8) is exceeded, the upper ray of off-axis becomes excessively corrected, causing an increase in the absolute value of the negative power of the third group and making it difficult to correct the Petzval sum. When the upper limit of condition (8) is exceeded, it is advantageous to correct the Petzval sum but the overall length of the lens becomes longer.

It is desirable, when a medium 3 is inserted between the third group 1 and the CRT 2 as shown in FIG. 1 and the refractive index of the medium is $n_{3C}$, to satisfy the following condition:

$$1.3 < n_{3C} < 1.6 \quad (9)$$

Generally, reflection factor R at a boundary of media having refractive indexes N1 and N2 is given by the following formula:

$$R = [(N_1 - N_2)^2/(N_1 - N_2)^2] \times 100 (\%)$$

From the above formula, it is known that the reflection factor sharply increases as the difference between N1 and N2 increases. When the gap between the face plate of the CRT and the third group is filled with air, the light flux irradiated from the CRT reflects at the boundary of the face plate of the CRT and the air and at the boundary of the aid and the third group which results in a flared light being projected exhibiting a deteriorated contrast.

However, by filling the gap with a medium having a refractive index to satisfy condition (9), the reflection at each of the boundaries is reduced remarkably, so that the contrast is improved. It is further desirable to make the surface directed to the CRT of the third group flat so that it is possible to fill the gap easily with a gel state substance or a solid state substance to thereby facilitate manufacturing.

Figure 2:
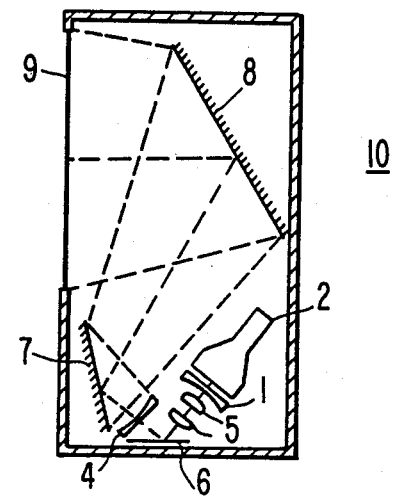
FIG. 2 is a schematic sectional view of a video projection apparatus employing the projection lens according to the present invention.
Figure 3:
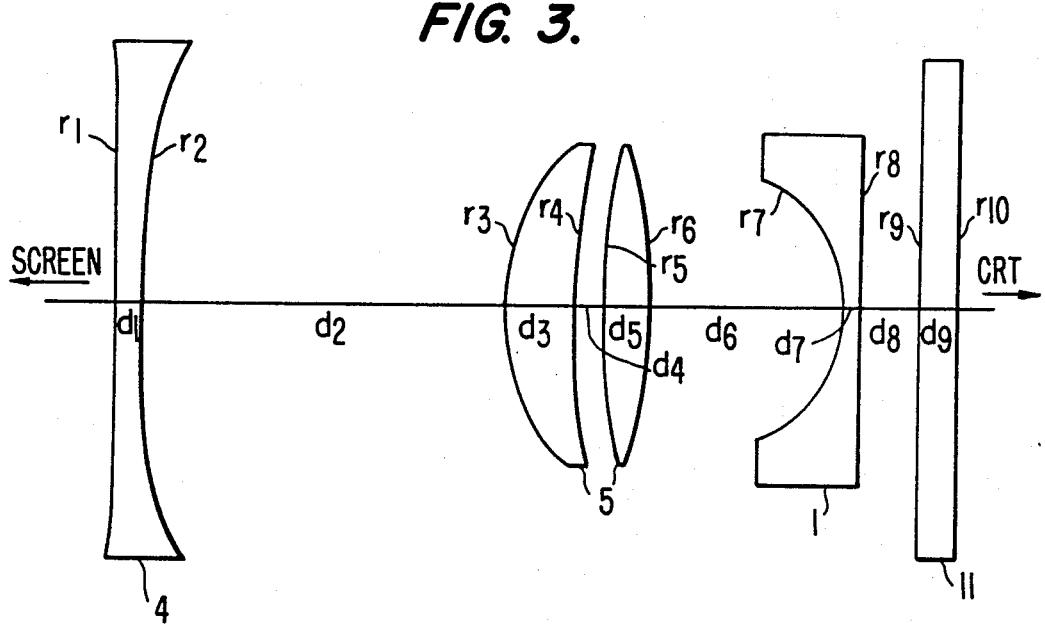
Figure 4:
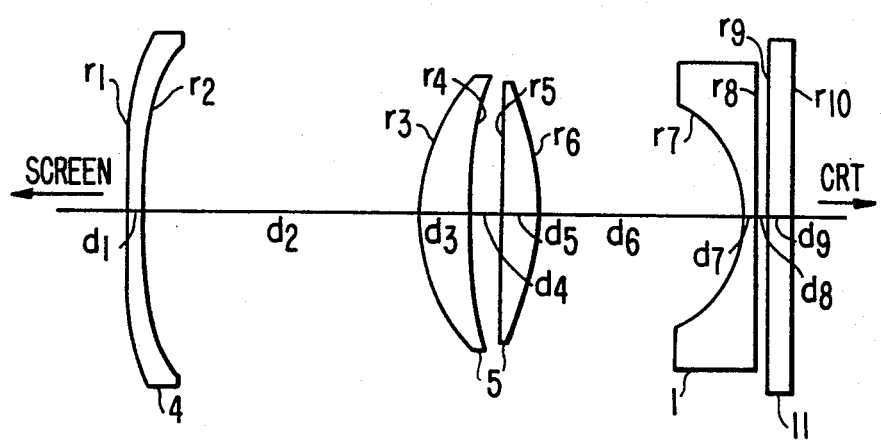
Figure 8:
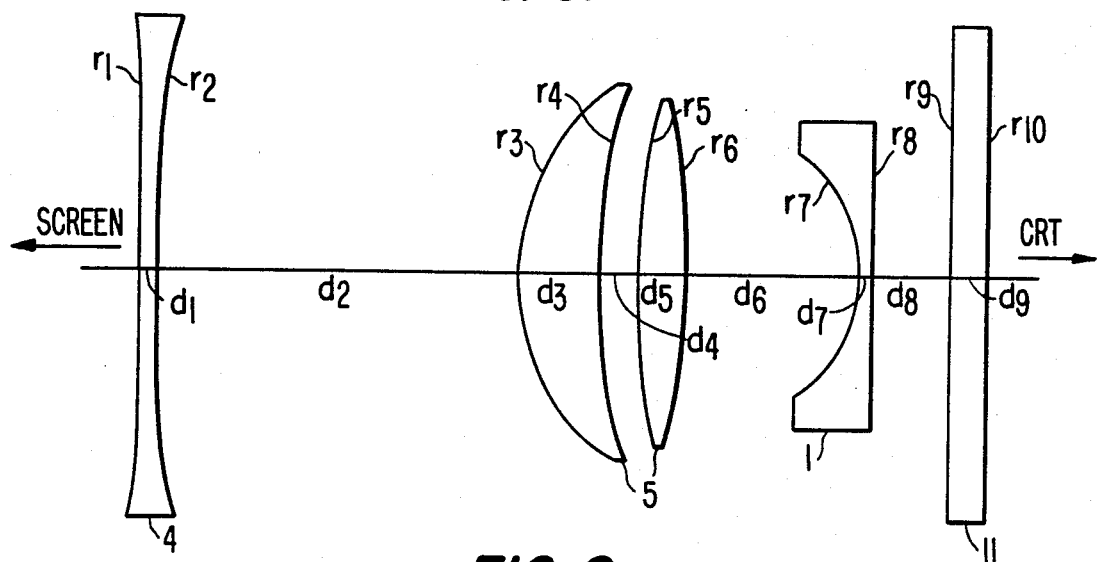
Figure 9:
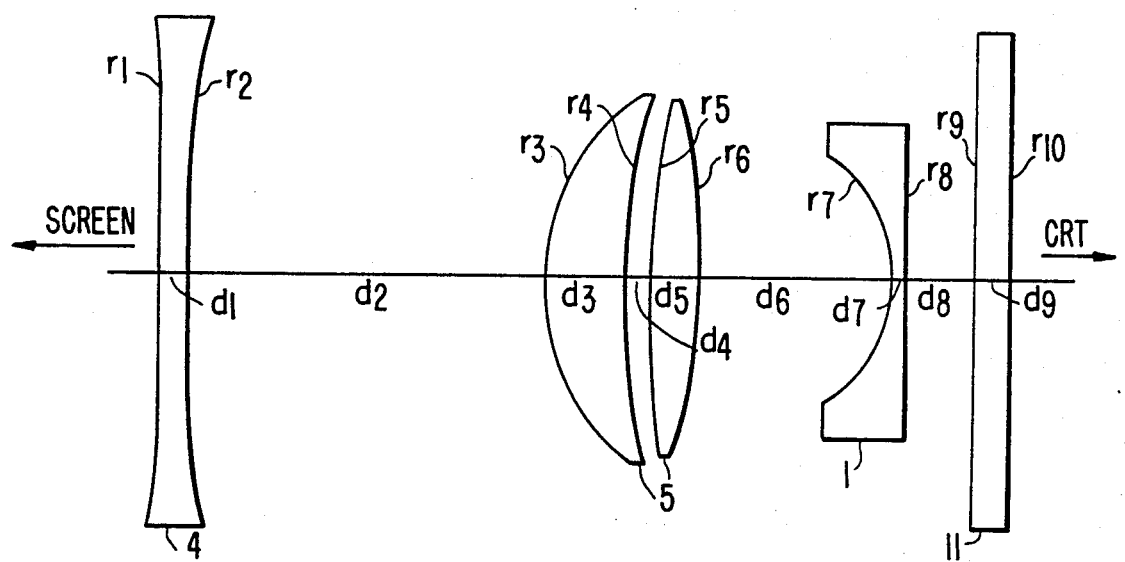
Figure 10:
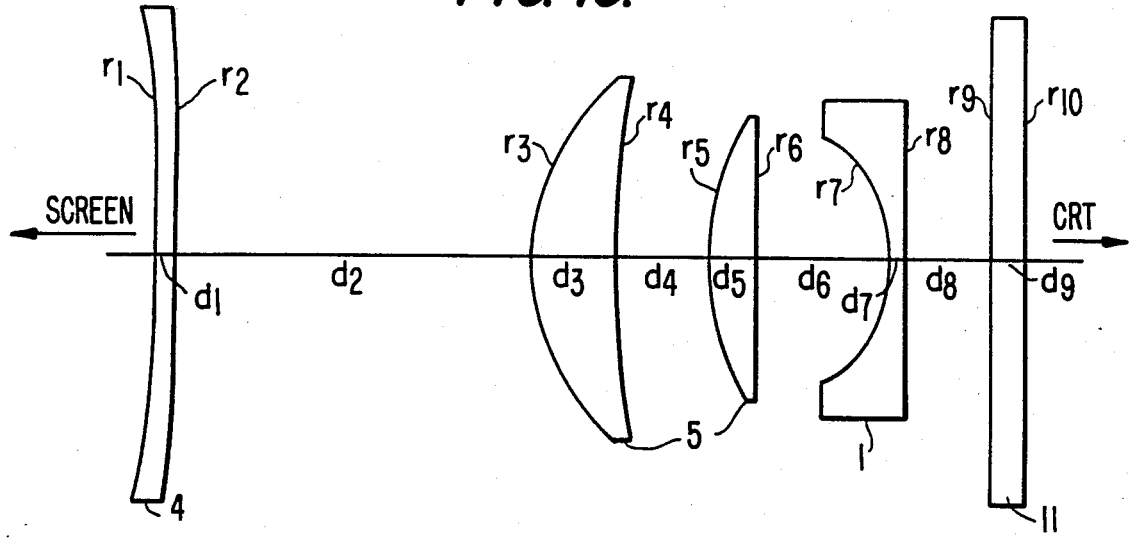
Figure 14:
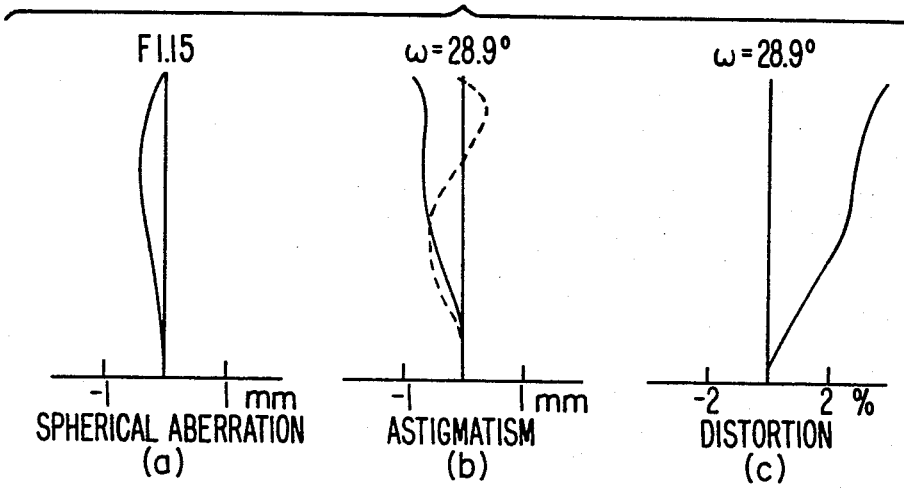
Figure 15:
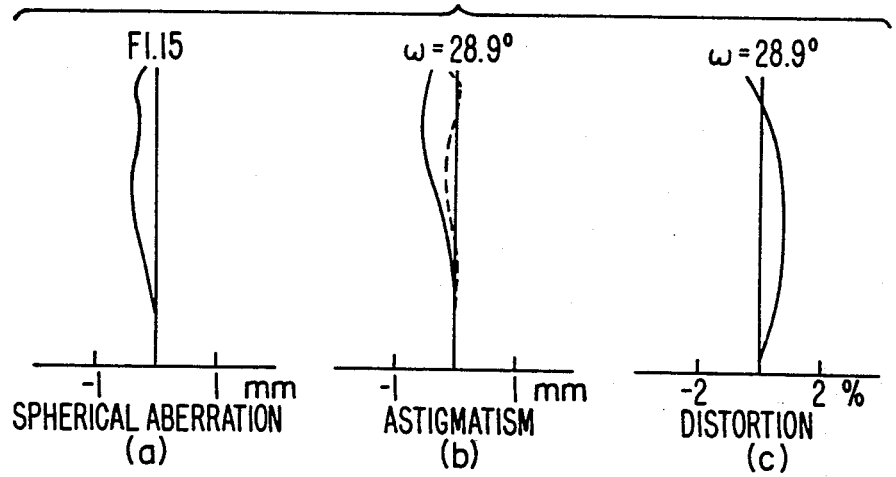
Figure 16:
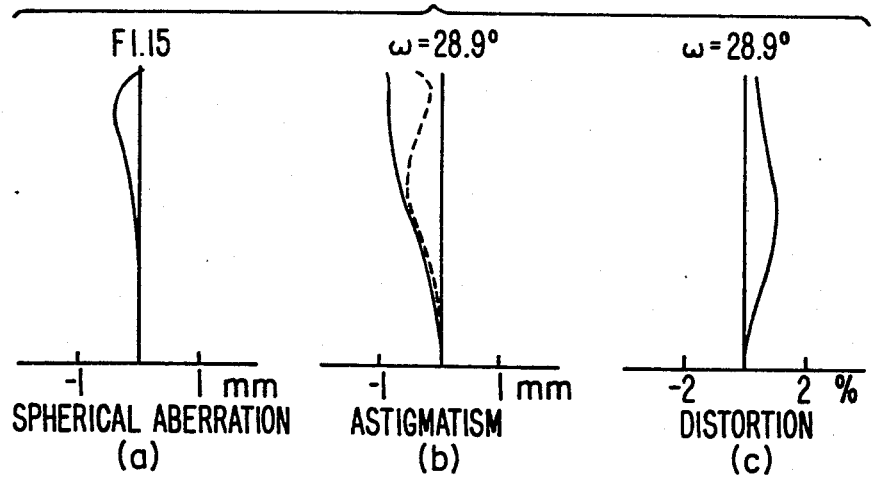
Figure 17:
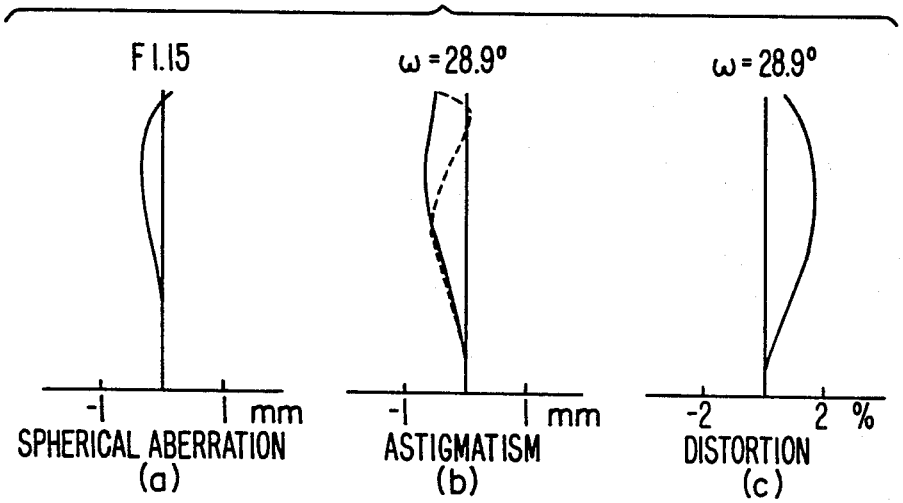
Figure 18:
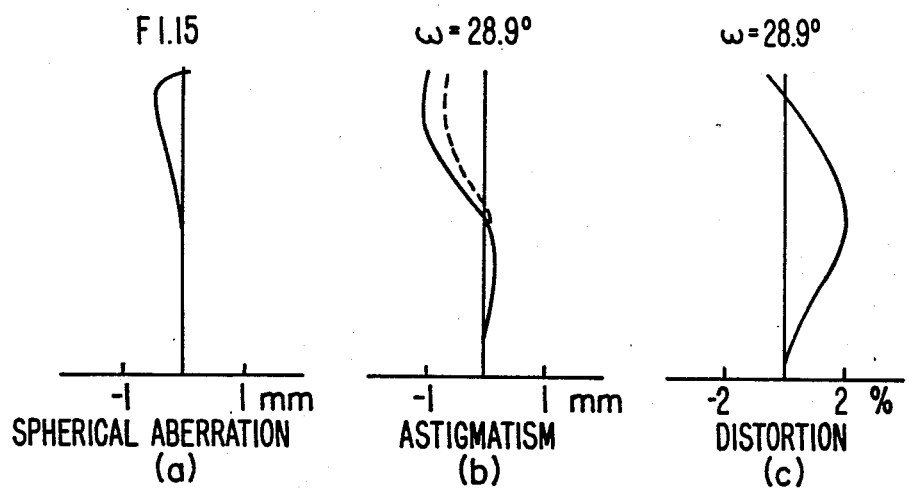

The projection lens according to the present invention can be provided, between the first group 4 and the second group 5, with a flat mirror 6 for bending the path of light as shown in FIG. 2.

With this arrangement, it is possible to reduce the size of the housing of the video projection apparatus to enlarge and display on the screen 9 an image which appears on the CRT, by using a first reflection mirror 7 and a second reflection mirror 8. When the distance between the first group 4 and the second group 5 is $d_2$, it is desirable to satisfy the following condition:

$$0.9 < d_2/f < 1.2 \qquad (10)$$

When the lower limit of condition (10) is exceeded, the distance $d_2$ between the first group 4 and the second group 5 is too small and it is impossible to install the flat mirror 6. When the upper limit is exceeded, the height of the on-axis light ray of the second group is greater, so that the effective diameter of the second group increases, resulting in higher cost; and spherical aberration generated at the second group is excessive, so that the correction thereof with the first group becomes difficult.

Hereafter, concrete embodiments of the present invention will be shown. In each embodiment, $r_1, r_2, r_3 \ldots$ represent radii of curvature of surfaces of lens elements disposed in sequence from the screen; $d_1, d_2, d_3, \ldots$ represent center thicknesses of the lens elements and distances therebetween; $n_1, n_2, n_3, \ldots$ represent refractive indexes for a wave length $\lambda = 546$ nm of the lens elements, $f_I, f_{II}, \ldots$ represent focal lengths of the lens group; f represents a focal length of the entire lens system; F represents the face plate of CRT: and $f_2$ and $f_3$ represent focal lengths of the first and second positive power lens element from the screen of the second group.

The shape of each aspheric surface in a Cartesian coordinate system with the direction of optical axis being the X axis (the Y axis being perpendicular to the X axis), is an aspheric surface of rotating symmetry expressed by the following formula:

$$X = \frac{CP^2}{1 + \sqrt{1 - (1 + K)C^2 P^2}} +$$

$$AD \cdot P^4 + AE \cdot P^6 + AF \cdot P^8 + AG \cdot P^{10}$$

$$P = \sqrt{Y^2 + Z^2}$$

where, C is the vertex curvature, K is a conic constant, and AD, AE, and AG are higher dimension constants.

First embodiment f = 98.082 mm  
Magnification −0.13  
Aperture ratio 1:1.2  
Semi-field angle 28.9°

$f/f_I = -0.099$　　$f/f_{II} = 1.105$　　$f/f_{III} = -0.833$  
$r_3/f = 0.649$　　$f_2/f_3 = 0.684$  
$d_4/f = 0.093$　　$d_6/f = 0.606$  
$f/r_6 = -0.562$　　$d_2/f = 1.141$

1st. group
- $r_1 = -1280.017$　$d_1 = 8.74$　$n_1 = 1.49383$　$f_I = -986.555$
- $r_2 = 788.351$　$d_2 = 111.906$ 2nd. group
- $r_3 = 63.650$　$d_3 = 21.54$　$n_2 = 1.49383$　$f_2 = 136.152$
- $r_4 = 1059.977$　$d_4 = 9.10$
- $r_5 = 352.492$　$d_5 = 12.72$　$n_3 = 1.59143$　$f_3 = 199.143$　　$f_{II} = 88.733$
- $r_6 = -174.508$　$d_6 = 59.39$ 3rd. group
- $r_7 = -55.751$　$d_7 = 5.89$　$n_4 = 1.49383$　$f_{III} = -117.759$
- $r_8 = -1396.607$　$d_8 = 17.70$ F
- $r_9 = \infty$　$d_9 = 11.30$　$n_5 = 1.50701$
- $r_{10} = \infty$ Coefficients of aspheric surface

| | K | AD | AE | AF | AG |
|---|---|---|---|---|---|
| 1st. surface: | $-1.05082 \times 10^2$ | $7.63139 \times 10^{-8}$ | $1.51074 \times 10^{-11}$ | $-5.37271 \times 10^{-15}$ | $1.40373 \times 10^{-19}$ |
| 2nd. surface: | $-4.38641 \times 10^{-2}$ | $1.98038 \times 10^{-7}$ | $4.97534 \times 10^{-11}$ | $-1.05390 \times 10^{-14}$ | $5.96385 \times 10^{-19}$ |
| 3rd. surface: | $-1.94627 \times 10^{-1}$ | $-8.07044 \times 10^{-8}$ | $2.13916 \times 10^{-11}$ | $-1.53137 \times 10^{-14}$ | $4.36742 \times 10^{-18}$ |
| 4th. surface: | $-1.01449 \times 10^3$ | $5.85368 \times 10^{-7}$ | $6.58807 \times 10^{-12}$ | $7.00464 \times 10^{-15}$ | $2.12344 \times 10^{-18}$ |
| 7th. surface: | $-2.47037 \times 10^{-1}$ | $-5.51369 \times 10^{-6}$ | $3.74904 \times 10^{-9}$ | $-2.06537 \times 10^{-12}$ | $1.23146 \times 10^{-16}$ |
| 8th. surface: | $-1.53904 \times 10^5$ | $-9.85118 \times 10^{-7}$ | $8.87484 \times 10^{-10}$ | $-3.41061 \times 10^{-13}$ | $4.76382 \times 10^{-17}$ |

Second embodiment f = 105.529  
Magnification −0.13  
Aperture ratio 1:1.5  
Semi-field angle 28.9°

$f/f_I = -0.051$　　$f/f_{II} = 0.991$　　$f/f_{III} = -0.779$  
$r_3/f = 0.800$　　$f_2/f_3 = 0.853$  
$d_4/f = 0.120$　　$d_6/f = 0.836$  
$f/r_6 = -0.800$　　$d_2/f = 1.137$

1st. group
- $r_1 = -4801.307$　$d_1 = 6.90$　$n_1 = 1.49383$　$f_I = -2086.826$
- $r_2 = 1312.813$　$d_2 = 120.00$ 2nd. group
- $r_3 = 84.412$　$d_3 = 22.05$　$n_2 = 1.49383$　$f_2 = 178.510$
- $r_4 = 1816.883$　$d_4 = 12.68$
- $r_5 = 1902.010$　$d_5 = 15.40$　$n_3 = 1.59143$　$f_3 = 209.156$　　$f_{II} = 106.524$ -continued

|  | | | | |
|---|---|---|---|---|
| | $r_6 = -131.907$ | $d_6 = 88.24$ | | |
| | $r_7 = -66.876$ | $d_7 = 6.00$ | $n_4 = 1.49383$ | $f_{III} = -135.422$ |
| 3rd. group | | | | |
| | $r_8 = \infty$ | $d_8 = 3.90$ | $n_{30} = 1.41000$ | |
| F | $r_9 = \infty$ | $d_9 = 11.10$ | $n_5 = 1.50701$ | |
| | $r_{10} = \infty$ | | | |

Coefficients of aspheric surface

| K | AD | AE | AF | AG |
|---|---|---|---|---|
| 1st. surface: $-5.76655 \times 10^3$ | $1.64296 \times 10^{-7}$ | $5.59700 \times 10^{-11}$ | $-4.68452 \times 10^{-15}$ | $2.94115 \times 10^{-19}$ |
| 2nd. surface: $3.36183 \times 10^2$ | $2.60315 \times 10^{-7}$ | $6.54447 \times 10^{-11}$ | $-6.51488 \times 10^{-15}$ | $1.26936 \times 10^{-18}$ |
| 3rd. surface: $-2.86337 \times 10^{-3}$ | $-3.94908 \times 10^{-8}$ | $4.33918 \times 10^{-11}$ | $-1.30657 \times 10^{-14}$ | $3.55685 \times 10^{-18}$ |
| 4th. surface: $-6.82145 \times 10^2$ | $4.70502 \times 10^{-7}$ | $3.56131 \times 10^{-11}$ | $4.93730 \times 10^{-15}$ | $1.75131 \times 10^{-18}$ |
| 7th. surface: $-2.96204$ | $-2.48603 \times 10^{-6}$ | $4.33827 \times 10^{-10}$ | $-1.78309 \times 10^{-13}$ | $-3.32527 \times 10^{-19}$ |

Third embodiment $f = 106.061$ mm  Aperture ratio 1:1.15
Magnification $-0.13$  Semi-field angle 28.9°
$f/f_I = -0.007$  $f/f_{II} = 1.139$  $f/f_{III} = -0.969$
$r_3/f = 0.620$  $f_2/f_3 = 0.646$
$d_4/f = 0.094$  $d_6/f = 0.540$
$f/r_6 = -0.551$  $d_2/f = 1.056$

|  | | | | |
|---|---|---|---|---|
| 1st. group | $r_1 = 1370.000$ | $d_1 = 8.91$ | $n_1 = 1.49383$ | $f_I = -14800.899$ |
| | $r_2 = 1151.265$ | $d_2 = 112.00$ | | |
| | $r_3 = 65.742$ | $d_3 = 21.00$ | $n_2 = 1.49383$ | $f_2 = 140.235$ |
| | $r_4 = 1159.807$ | $d_4 = 9.94$ | | |
| 2nd. group | $r_5 = 374.412$ | $d_5 = 13.50$ | $n_3 = 1.59143$ | $f_3 = 216.925$  $f_{II} = 93.096$ |
| | $r_6 = -192.558$ | $d_6 = 57.25$ | | |
| | $r_7 = -53.484$ | $d_7 = 4.00$ | $n_4 = 1.49383$ | $f_{III} = -109.411$ |
| 3rd. group | | | | |
| | $r_8 = -5412.695$ | $d_8 = 18.96$ | | |
| F | $r_9 = \infty$ | $d_9 = 11.30$ | $n_5 = 1.50701$ | |
| | $r_{10} = -2350.000$ | | | |

Coefficients of aspheric surface

| K | AD | AE | AF | AG |
|---|---|---|---|---|
| 1st. surface: $-1.05058 \times 10^2$ | $-8.85701 \times 10^{-9}$ | $-4.18169 \times 10^{-13}$ | $-1.42810 \times 10^{-15}$ | $1.97590 \times 10^{-20}$ |
| 2nd. surface: $1.71773 \times 10^2$ | $5.48652 \times 10^{-8}$ | $2.24762 \times 10^{-11}$ | $-4.70651 \times 10^{-15}$ | $2.79996 \times 10^{19}$ |
| 3rd. surface: $-9.94130 \times 10^{-2}$ | $-5.08379 \times 10^{-8}$ | $2.23594 \times 10^{-11}$ | $-1.49012 \times 10^{-14}$ | $4.30892 \times 10^{-18}$ |
| 4th. surface: $-1.01450 \times 10^3$ | $5.44324 \times 10^{-7}$ | $7.39177 \times 10^{-12}$ | $5.61455 \times 10^{-15}$ | $2.03552 \times 10^{-18}$ |
| 7th. surface: $-1.62178 \times 10^{-1}$ | $-4.45342 \times 10^{-6}$ | $3.30690 \times 10^{-9}$ | $-1.92313 \times 10^{-12}$ | $2.46073 \times ^{-16}$ |
| 8th. surface: $-1.53904 \times 10^5$ | $-1.07453 \times 10^{-6}$ | $1.03154 \times 10^{-9}$ | $-3.63398 \times 10^{-13}$ | $4.70098 \times 10^{-17}$ |

Fourth embodiment $f = 106.039$ mm  Aperture ratio 1:1.15
Magnification $-0.13$  Semi-field angle 28.9°
$f/f_I = -0.032$  $f/f_{II} = 1.130$  $f/f_{III} = -0.984$
$r_3/f = 0.628$  $f_2/f_3 = 0.686$
$d_4/f = 0.127$  $d_6/f = 0.543$
$f/r_6 = -0.557$  $d_2/f = 1.056$

|  | | | | |
|---|---|---|---|---|
| 1st. group | $r_1 = 4087.131$ | $d_1 = 8.91$ | $n_1 = 1.49383$ | $f_I = -3362.091$ |
| | $r_2 = 1179.832$ | $d_2 = 112.00$ | | |
| | $r_3 = 66.561$ | $d_3 = 21.30$ | $n_2 = 1.49383$ | $f_2 = 142.839$ |
| | $r_4 = 1055.444$ | $d_4 = 13.42$ | | |
| 2nd. group | $r_5 = 339.916$ | $d_5 = 13.60$ | $n_3 = 1.59143$ | $f_3 = 208.238$  $f_{II} = 93.827$ |
| | $r_6 = -190.262$ | $d_6 = 57.63$ | | |
| | $r_7 = -54.495$ | $d_7 = 4.00$ | $n_4 = 1.49383$ | $f_{III} = -107.754$ |
| 3rd. group | | | | |
| | $r_8 = 2316.795$ | $d_8 = 18.94$ | | |
| $r_9 = \infty$ | $d_9 = 11.30$ | $n_5 = 1.50701$ | | |
| F | $r_{10} = -2350.000$ | | | |

Coefficients of aspheric surface

| K | AD | AE | AF | AG |
|---|---|---|---|---|
| 1st. surface: $-1.05058 \times 10^2$ | $-2.14658 \times 10^{-9}$ | $3.96503 \times 10^{-13}$ | $-1.36503 \times 10^{-15}$ | $4.71382 \times 10^{-20}$ |
| 2nd. surface: $1.71773 \times 10^2$ | $6.03050 \times 10^{-8}$ | $2.12650 \times 10^{-11}$ | $-4.58825 \times 10^{-15}$ | $3.19582 \times 10^{-19}$ |
| 3rd. surface: $-9.94130 \times 10^{-2}$ | $-5.08379 \times 10^{-8}$ | $2.23594 \times 10^{-11}$ | $-1.49012 \times 10^{-14}$ | $4.30892 \times 10^{-18}$ |
| 4th. surface: $-1.01450 \times 10^3$ | $5.56705 \times 10^{-7}$ | $5.86500 \times 10^{-12}$ | $5.43570 \times 10^{-15}$ | $2.10615 \times 10^{-18}$ |
| 7th. surface: $-1.62178 \times 10^{-1}$ | $-5.00570 \times 10^{-6}$ | $3.29928 \times 10^{-9}$ | $-1.78049 \times 10^{-12}$ | $2.84150 \times 10^{-16}$ |
| 8th. surface: $-1.53904 \times 10^5$ | $-1.39105 \times 10^{-6}$ | $1.11090 \times 10^{-9}$ | $-3.55644 \times 10^{-13}$ | $4.53993 \times 10^{-17}$ |

Fifth embodiment $f = 106.287$ mm  Aperture ratio 1:1.15
Magnification $-0.13$  Semi-field angle 28.9°
$f/f_I = -0.051$  $f/f_{II} = 1.106$  $f/f_{III} = -0.887$
$r_3/f = 0.652$  $f_2/f_3 = 0.715$
$d_4/f = 0.083$  $d_6/f = 0.591$
$f/r_6 = -0.568$  $d_2/f = 1.129$

|  | | | | |
|---|---|---|---|---|
| 1st. group | $r_1 = 5140.170$ | $d_1 = 7.00$ | $n_1 = 1.49383$ | $f_I = -2088.734$ |
| | $r_2 = 858.704$ | $d_2 = 120.00$ | | |
| | $r_3 = 69.308$ | $d_3 = 24.22$ | $n_2 = 1.49383$ | $f_2 = 149.904$ |
| | $r_4 = 961.584$ | $d_4 = 8.77$ | | |

-continued

| | | | | | | |
|---|---|---|---|---|---|---|
| 2nd. group | $r_5 = 355.946$ | $d_5 = 15.40$ | $n_3 = 1.59143$ | $f_3 = 209.573$ | | $f_{II} = 96.078$ |
| | $r_6 = -187.109$ | $d_6 = 62.81$ | | | | |
| 3rd. group | $r_7 = -60.000$ | $d_7 = 4.00$ | $n_4 = 1.49383$ | $f_{III} = -119.864$ | | |
| | $r_8 = 4498.121$ | $d_8 = 18.60$ | | | | |
| F | $r_9 = \infty$ | $d_9 = 11.30$ | $n_5 = 1.50701$ | | | |
| | $r_{10} = -2350.000$ | | | | | |

Coefficients of aspheric surface

| K | | AD | AE | AF | AG |
|---|---|---|---|---|---|
| 1st. surface: | $-7.64965 \times 10^4$ | $2.85526 \times 10^{-8}$ | $7.30268 \times 10^{-12}$ | $-1.18634 \times 10^{-15}$ | $3.15567 \times 10^{-20}$ |
| 2nd. surface: | $9.99223 \times 10^1$ | $7.95969 \times 10^{-8}$ | $3.56754 \times 10^{-11}$ | $-7.05636 \times 10^{-15}$ | $7.57821 \times 10^{-19}$ |
| 3rd. surface: | $-1.51018 \times 10^{-1}$ | $-5.85677 \times 10^{-8}$ | $1.78349 \times 10^{-11}$ | $-1.42113 \times 10^{-14}$ | $2.87506 \times 10^{-18}$ |
| 4th. surface: | $-1.01450 \times 10^3$ | $5.14373 \times 10^{-7}$ | $5.08680 \times 10^{-12}$ | $-2.10352 \times 10^{-15}$ | $2.43371 \times 10^{-18}$ |
| 7th. surface: | $1.72768 \times 10^{-1}$ | $-3.46249 \times 10^{-6}$ | $2.11443 \times 10^{-9}$ | $-1.03361 \times 10^{-12}$ | $9.83104 \times 10^{-17}$ |
| 8th. surface: | $0.0$ | $-1.11968 \times 10^{-6}$ | $8.40665 \times 10^{-10}$ | $-2.75243 \times 10^{-13}$ | $3.50564 \times 10^{-17}$ |

Sixth embodiment $f = 107.947$ mm  Aperture ratio 1:1.15
Magnification $-0.13$  Semi-field angle 28.9°
$f/f_I = -0.050$  $f/f_{II} = 1.169$  $f/f_{III} = -0.983$
$r_3/f = 0.614$  $f_2/f_3 = 0.733$
$d_4/f = 0.103$  $d_6/f = 0.488$
$f/r_6 = -0.498$  $d_2/f = 1.038$

| | | | | | |
|---|---|---|---|---|---|
| 1st. group | $r_1 = -16398.100$ | $d_1 = 5.00$ | $n_1 = 1.49383$ | $f_I = -2153.689$ | |
| | $r_2 = 1137.444$ | $d_2 = 112.00$ | | | |
| 2nd. group | $r_3 = 66.306$ | $d_3 = 25.70$ | $n_2 = 1.49383$ | $f_2 = 143.920$ | |
| | $r_4 = 862.016$ | $d_4 = 11.15$ | | | |
| | $r_5 = 244.021$ | $d_5 = 13.79$ | $n_3 = 1.59143$ | $f_3 = 196.311$ | |
| | $r_6 = -216.833$ | $d_6 = 52.71$ | | | |
| 3rd. group | $r_7 = -55.657$ | $d_7 = 4.00$ | $n_4 = 1.49383$ | $f_{III} = -109.807$ | |
| | $r_8 = 2160.371$ | $d_8 = 24.97$ | | | |
| F | $r_9 = \infty$ | $d_9 = 11.30$ | $n_5 = 1.50701$ | | |
| | $r_{10} = -2350.000$ | | | | |

Coefficients of aspheric surface

| K | | AD | AE | AF | AG |
|---|---|---|---|---|---|
| 1st. surface: | $1.94862 \times 10^4$ | $-8.92777 \times 10^{-9}$ | $1.24915 \times 10^{-12}$ | $-1.63183 \times 10^{-15}$ | $7.66087 \times 10^{-20}$ |
| 2nd. surface: | $1.71830 \times 10^2$ | $8.53453 \times 10^{-8}$ | $1.90773 \times 10^{-11}$ | $-4.03086 \times 10^{-15}$ | $3.42392 \times 10^{-19}$ |
| 3rd. surface: | $-9.94145 \times 10^{-2}$ | $-1.25888 \times 10^{-7}$ | $3.58961 \times 10^{-11}$ | $-1.61421 \times 10^{-14}$ | $2.25431 \times 10^{-18}$ |
| 4th. surface: | $-1.01450 \times 10^3$ | $5.12807 \times 10^{-7}$ | $2.09090 \times 10^{-13}$ | $3.33912 \times 10^{-15}$ | $2.10826 \times 10^{-18}$ |
| 7th. surface: | $-1.62640 \times 10^{-1}$ | $-3.68723 \times 10^{-6}$ | $2.97716 \times 10^{-9}$ | $-1.72839 \times 10^{-12}$ | $2.25205 \times 10^{-16}$ |
| 8th. surface: | $-1.53904 \times 10^5$ | $-6.93351 \times 10^{-7}$ | $9.27006 \times 10^{-10}$ | $-3.94031 \times 10^{-13}$ | $6.08675 \times 10^{-17}$ |

Seventh embodiment $f = 106.333$ mm  Aperture ratio 1:1.15
Magnification $-0.13$  Semi-field angle 28.9°
$f/f_I = -0.050$  $f/f_{II} = 1.138$  $f/f_{III} = -0.952$
$r_3/f = 0.615$  $f_2/f_3 = 0.655$
$d_4/f = 0.072$  $d_6/f = 0.551$
$f/r_6 = -0.536$  $d_2/f = 1.053$

| | | | | | | |
|---|---|---|---|---|---|---|
| 1st. group | $r_1 = -22696.200$ | $d_1 = 8.40$ | $n_1 = 1.49383$ | $f_I = -2121.631$ | | |
| | $r_2 = 1098.573$ | $d_2 = 112.00$ | | | | |
| 2nd. group | $r_3 = 65.412$ | $d_3 = 24.91$ | $n_2 = 1.49383$ | $f_2 = 141.119$ | | |
| | $r_4 = 931.499$ | $d_4 = 7.70$ | | | | |
| | $r_5 = 347.000$ | $d_5 = 14.00$ | $n_3 = 1.59143$ | $f_3 = 215.481$ | | $f_{II} = 93.426$ |
| | $r_6 = -198.394$ | $d_6 = 58.61$ | | | | |
| 3rd. group | $r_7 = -56.705$ | $d_7 = 4.00$ | $n_4 = 1.49383$ | $f_{III} = -111.642$ | | |
| | $r_8 = 2034.267$ | $d_8 = 21.17$ | | | | |
| F | $r_9 = \infty$ | $d_9 = 11.30$ | $n_5 = 1.50701$ | | | |
| | $r_{10} = -2350.000$ | | | | | |

Coefficients of aspheric surface

| K | | AD | AE | AF | AG |
|---|---|---|---|---|---|
| 1st. surface: | $5.79455 \times 10^4$ | $-6.18619 \times 10^{-9}$ | $2.79437 \times 10^{-13}$ | $-1.46662 \times 10^{-15}$ | $3.73496 \times 10^{-20}$ |
| 2nd. surface: | $1.71830 \times 10^2$ | $7.84608 \times 10^{-8}$ | $2.02139 \times 10^{-11}$ | $-4.49600 \times 10^{-15}$ | $3.28235 \times 10^{-19}$ |
| 3rd. surface: | $-9.94145 \times 10^{-2}$ | $-1.30086 \times 10^{-7}$ | $2.53125 \times 10^{-11}$ | $-1.72662 \times 10^{-14}$ | $2.53377 \times 10^{-18}$ |
| 4th. surface: | $-1.01450 \times 10^3$ | $5.34556 \times 10^{-7}$ | $-2.62827 \times 10^{-12}$ | $3.29229 \times 10^{-15}$ | $2.42110 \times 10^{-18}$ |
| 7th. surface: | $-1.62640 \times 10^{-1}$ | $-4.30942 \times 10^{-6}$ | $3.06271 \times 10^{-9}$ | $-1.86265 \times 10^{-12}$ | $2.21247 \times 10^{-16}$ |
| 8th. surface: | $-1.53904 \times 10^5$ | $-9.26936 \times 10^{-7}$ | $8.96134 \times 10^{-10}$ | $-3.61631 \times 10^{-13}$ | $5.35283 \times 10^{-17}$ |

Eighth embodiment $f = 109.777$ mm  Aperture ratio 1:1.15
Magnification $-0.13$  Semi-field angle 28.9°
$f/f_I = -0.050$  $f/f_{II} = 1.167$  $f/f_{III} = -0.923$
$r_3/f = 0.615$  $f_2/f_3 = 0.864$
$d_4/f = 0.257$  $d_6/f = 0.369$
$f/r_6 = 0$  $d_2/f = 1.020$

| | | | | | |
|---|---|---|---|---|---|
| 1st. group | $r_1 = -6624.967$ | $d_1 = 5.00$ | $n_1 = 1.49383$ | $f_I = -2193.838$ | |
| | $r_2 = 1295.518$ | $d_2 = 112.00$ | | | |

-continued

| | | | | | |
|---|---|---|---|---|---|
| | $r_3 = 67.553$ | $d_3 = 26.67$ | $n_2 = 1.49383$ | $f_2 = 149.316$ | |
| 2nd. group | $r_4 = 700.262$ | $d_4 = 28.17$ | | | |
| | $r_5 = 102.267$ | $d_5 = 13.70$ | $n_3 = 1.59143$ | $f_3 = 172.916$ | $f_{II} = 94.033$ |
| | $r_6 = \infty$ | $d_6 = 40.56$ | | | |
| 3rd. group | $r_7 = -54.823$ | $d_7 = 4.00$ | $n_4 = 1.49383$ | $f_{III} = -118.920$ | |
| | $r_8 = -844.766$ | $d_8 = 26.95$ | | | |
| F | $r_9 = \infty$ | $d_9 = 11.30$ | $n_5 = 1.50701$ | | |
| | $r_{10} = -2350.000$ | | | | |

Coefficients of aspheric surface

| K | AD | AE | AF | AG |
|---|---|---|---|---|
| 1st. surface: $6.17611 \times 10^3$ | $-5.29692 \times 10^{-8}$ | $-4.16941 \times 10^{-12}$ | $-2.52947 \times 10^{-15}$ | $1.45964 \times 10^{-19}$ |
| 2nd. surface: $1.71830 \times 10^2$ | $1.49753 \times 10^{-8}$ | $4.54207 \times 10^{-12}$ | $-3.92648 \times 10^{-15}$ | $2.01987 \times 10^{-19}$ |
| 3rd. surface: $-9.94145 \times 10^{-2}$ | $-9.15626 \times 10^{-8}$ | $3.44734 \times 10^{-11}$ | $-1.58656 \times 10^{-14}$ | $7.09830 \times 10^{-19}$ |
| 4th. surface: $-1.01450 \times 10^3$ | $4.06665 \times 10^{-7}$ | $-2.75475 \times 10^{-11}$ | $-5.21818 \times 10^{-15}$ | $2.00138 \times 10^{-18}$ |
| 7th. surface: $-1.62640 \times 10^{-1}$ | $-3.19564 \times 10^{-6}$ | $2.35554 \times 10^{-9}$ | $-1.29075 \times 10^{-12}$ | $2.66089 \times 10^{-16}$ |
| 8th. surface: $-1.53904 \times 10^5$ | $-8.33234 \times 10^{-7}$ | $1.08978 \times 10^{-9}$ | $-4.28388 \times 10^{13}$ | $6.10697 \times 10^{-17}$ |

Lens element dispositions of the first through eighth embodiments are respectively shown in FIGS. 3 through 10, and their aberration curves are respectively shown in FIGS. 11 through 18. In each of FIGS. 3 through 10, 4 denotes the first group lens, 5 the second group lens, 1 the third group lens, and 11 the face plate of CRT.

What is claimed is:

1. A projection lens for projecting an enlargement of an image appearing on a cathode ray tube (CRT) onto a screen, comprising: in sequence from the screen, a first lens unit having a negative power and at least one aspheric surface for correcting spherical aberration, comma and distortion; a second lens unit having a positive power for contributing to image formation and at least one aspheric surface for correcting residual spherical aberration and comma; and a third lens unit having a negative power and at least one aspheric surface with a strong concave surface directed to the screen for correcting curvature of field and distortion.

2. A projection lens according to claim 1, satisfying the following conditions:

$$-0.1 < f/f_I < 0 \quad (1)$$

$$0.9 < f/f_{II} < 1.2 \quad (2)$$

$$-1.1 < f/f_{III} < -0.7 \quad (3)$$

where:
f: Focal length of entire lens system
$f_I$: Focal length of the first unit
$f_{II}$: Focal length of the second unit
$f_{III}$: Focal length of the third unit.

3. A projection lens according to claim 1, wherein the second unit is comprised of two positive power lens elements and satisfies the following condition:

$$0.55 < r_3/f < 0.85$$

where:
f: Focal length of entire lens system
$r_3$: Radius of curvature to the screen end of the first lens element from the screen end of the two positive power lens elements.

4. A projection lens according to claim 1, wherein the second unit is comprised, from the screen side, of a positive power plastic lens element and a positive power glass lens element.

5. A projection lens according to claim 1, satisfying the following relation:

$$0.55 < f_2/f_3 < 0.95$$

where $f_2$ and $f_3$ are focal lengths of the plastic and glass lens elements, respectively.

6. A projection lens according to claim 1, wherein the second unit is comprised of two positive power lens elements and satisfies the following condition:

$$d_4/f < 0.35$$

where f is the focal length of entire lens system and $d_4$ is a distance between the two lens elements.

7. A projection lens according to claim 1, satisfying the following condition:

$$0.3 < d_6/f < 0.9$$

where f is the focal length of entire lens system and $d_6$ is a distance between the second unit and the third unit.

8. A projection lens according to claim 1, wherein the unit is comprised of two positive power lens elements and satisfies the following condition:

$$-0.85 < f/r_6 < 0$$

where f is the focal length of the entire lens systems and $r_6$ is a radius of curvature at and end of the third unit facing the two positive power lens elements.

9. A projection lens according to claim 1, wherein a gap between the third unit and a face plate of the CRT is filled with a medium having a refractive index $n_{3C}$ expressed as follows:

$$1.3 < n_{3C} < 1.6.$$

10. A projection lens according to claim 1, wherein a surface directed to the CRT of the third unit is a flat surface.

11. A projection lens according to claim 1, wherein a flat mirror for bending a path of light is provided between the first unit and the second unit.

12. A projection lens according to claim 1, satisfying the following condition:

$$0.9 < d_2/f < 1.2$$

where f is focal length of the entire lens system and $d_2$ is a distance between the first unit and the second unit.

13. A projection lens according to claim 1, substantially described as follows:

|  |  | focal length 98.082 mm, aperture ratio 1:1.2, magnification −0.13, semi-field angle 28.9° |  |  |
|---|---|---|---|---|
| 1st. unit | $r_1 = -1280.017$ | $d_1 = 8.74$ | $n_1 = 1.49383$ |
|  | $r_2 = 788.351$ | $d_2 = 111.908$ |  |
| 2nd. unit | $r_3 = 63.650$ | $d_3 = 21.54$ | $n_2 = 1.49383$ |
|  | $r_4 = 1059.977$ | $d_4 = 9.10$ |  |
|  | $r_5 = 352.492$ | $d_5 = 12.72$ | $n_3 = 1.59143$ |
|  | $r_6 = -174.508$ | $d_6 = 59.39$ |  |
| 3rd. unit | $r_7 = -55.751$ | $d_7 = 5.89$ | $n_4 = 1.49383$ |
|  | $r_8 = -1396.607$ | $d_8 = 17.70$ |  |
| F | $r_9 = \infty$ | $d_9 = 11.30$ | $n_5 = 1.50701$ |
|  | $r_{10} = \infty$ |  |  |

Coefficients of aspheric surface

| | K | AD | AE | AF | AG |
|---|---|---|---|---|---|
| 1st. surface: | $-1.05082 \times 10^2$ | $7.63139 \times 10^{-8}$ | $1.51074 \times 10^{-11}$ | $-5.37271 \times 10^{-15}$ | $1.40373 \times 10^{-19}$ |
| 2nd. surface: | $-4.38641 \times 10^{-2}$ | $1.93038 \times 10^{-7}$ | $4.97534 \times 10^{-11}$ | $-1.05390 \times 10^{-14}$ | $5.96385 \times 10^{-19}$ |
| 3rd. surface: | $-1.94627 \times 10^{-1}$ | $-8.07044 \times 10^{-8}$ | $2.13916 \times 10^{-11}$ | $-1.53137 \times 10^{-14}$ | $4.36742 \times 10^{-18}$ |
| 4th. surface: | $-1.01449 \times 10^3$ | $5.85368 \times 10^{-7}$ | $6.58807 \times 10^{-12}$ | $7.00464 \times 10^{-15}$ | $2.12344 \times 10^{-18}$ |
| 7th. surface: | $-1.47037 \times 10^{-1}$ | $-5.51369 \times 10^{-6}$ | $3.74904 \times 10^{-9}$ | $-2.06537 \times 10^{-12}$ | $1.23146 \times 10^{-16}$ |
| 8th. surface: | $-1.53904 \times 10^5$ | $-9.85118 \times 10^{-7}$ | $8.87484 \times 10^{-10}$ | $-3.41061 \times 10^{-13}$ | $4.76382 \times 10^{-17}$ | were: $r_1, r_2, r_3, \ldots$ are radii of curvature of successive surfaces of successive elements from the screen end; $d_1, d_2, d_3, \ldots$ are center thicknesses of the lens elements and distances therebetween; $n_1, n_2, n_3, \ldots$ are refractive indexes for a wave length $\lambda = 546$ nm of the lens elements; and F denotes a face plate of the CRT, wherein each aspheric surface is expressed in a Cartesian coordinate system having X axis in a direction of optical axis and Y axis perpendicular to X axis, as follows:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, AD, AE, AF and AG are constants.

14. A projection lens according to claim 1, substantially described as follows:

where: $r_1, r_2, r_3, \ldots$ are radii of curvature of successive surfaces of successive lens elements from the screen end; $d_1, d_2, d_3, \ldots$ are center thicknesses of the lens elements and distances therebetween; $n_1, n_2, n_3, \ldots$ are refractive indexes for a wave length $\lambda = 546$ nm of the lens elements; and F denotes a face plate of the CRT, wherein each aspheric surface is expressed in a Cartesian coordinate system having X axis in a direction of optical axis and Y axis perpendicular to X axis, as follows:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, AD, AE, AF and AG are constants.

15. A projection lens according to claim 1, substantially described as follows:

|  |  | focal length 105.529 mm, aperture ratio 1:1.15, magnification −0.13, semi-field angle 28.9° |  |  |
|---|---|---|---|---|
| 1st. unit | $r_1 = -4801.307$ | $d_1 = 6.90$ | $n_1 = 1.49383$ |
|  | $r_2 = 1312.813$ | $d_2 = 120.00$ |  |
| 2nd. unit | $r_3 = 84.412$ | $d_3 = 22.05$ | $n_2 = 1.49383$ |
|  | $r_4 = 1816.883$ | $d_4 = 12.68$ |  |
|  | $r_5 = 1902.010$ | $d_5 = 15.40$ | $n_3 = 1.59143$ |
|  | $r_6 = -131.987$ | $d_6 = 88.24$ |  |
| 3rd. unit | $r_7 = -66.876$ | $d_7 = 6.00$ | $n_4 = 1.49383$ |
|  | $r_8 = \infty$ | $d_8 = 3.90$ | $n_{30} = 1.41000$ |
| F | $r_9 = \infty$ | $d_9 = 11.10$ | $n_5 = 1.50701$ |
|  | $r_{10} = \infty$ |  |  |

Coefficients of aspheric surface

| | K | AD | AE | AF | AG |
|---|---|---|---|---|---|
| 1st. surface: | $-5.76655 \times 10^3$ | $1.64296 \times 10^{-7}$ | $5.59700 \times 10^{-11}$ | $-4.63452 \times 10^{-15}$ | $2.94115 \times 10^{-19}$ |
| 2nd. surface: | $3.36183 \times 10^2$ | $2.60315 \times 10^{-7}$ | $6.54447 \times 10^{-11}$ | $-6.51483 \times 10^{-18}$ | $1.26936 \times 10^{-18}$ |
| 3rd. surface: | $-2.86337 \times 10^{-3}$ | $-3.94908 \times 10^{-8}$ | $4.33918 \times 10^{-11}$ | $-1.30657 \times 10^{-14}$ | $3.55685 \times 10^{-18}$ |
| 7th. surface: | $-6.82145 \times 10^1$ | $4.70582 \times 10^{-7}$ | $3.56131 \times 10^{-11}$ | $4.93730 \times 10^{-15}$ | $1.75131 \times 10^{-18}$ |
| 8th. surface: | $-1.96204$ | $-2.48603 \times 10^{-6}$ | $4.33827 \times 10^{-10}$ | $-1.78309 \times 10^{-13}$ | $-3.32527 \times 10^{-19}$ |

| | focal length 106.061 mm, aperture ratio 1:1.15, magnification −0.13, semi-field angle 28.9° | | |
|---|---|---|---|
| 1st. unit | $\begin{cases} r_1 = 1370.000 \\ r_2 = 1151.265 \end{cases}$ | $\begin{matrix} d_1 = 8.91 \\ d_2 = 112.00 \end{matrix}$ | $n_1 = 1.49383$ |
| 2nd. unit | $\begin{cases} r_3 = 65.742 \\ r_4 = 1159.807 \\ r_5 = 374.412 \\ r_6 = 192.558 \end{cases}$ | $\begin{matrix} d_3 = 21.00 \\ d_4 = 9.94 \\ d_5 = 13.50 \\ d_6 = 57.28 \end{matrix}$ | $\begin{matrix} n_2 = 1.49383 \\ \\ n_3 = 1.59143 \end{matrix}$ |

$$P = \sqrt{Y^2 + Z^2}$$

where, C is a vertex curvature, K is a conic constant, AD, AE, AF and AG are constants.

16. A projection lens according to claim 1, substantially described as follows:

| | focal length 106.039 mm, aperture ratio 1:1.15, magnification −0.13, semi-field angle 28.9° | | |
|---|---|---|---|
| 1st. unit | $\begin{cases} r_1 = 4087.131 \\ r_2 = 1179.832 \end{cases}$ | $\begin{matrix} d_1 = 8.91 \\ d_2 = 112.00 \end{matrix}$ | $n_1 = 1.49383$ |
| 2nd. unit | $\begin{cases} r_3 = 66.561 \\ r_4 = 1055.444 \\ r_5 = 339.916 \\ r_6 = -190.262 \end{cases}$ | $\begin{matrix} d_3 = 21.30 \\ d_4 = 13.42 \\ d_5 = 13.60 \\ d_6 = 57.63 \end{matrix}$ | $\begin{matrix} n_2 = 1.49383 \\ \\ n_3 = 1.59143 \end{matrix}$ |
| 3rd. unit | $\begin{cases} r_7 = -54.495 \\ r_8 = 2316.795 \end{cases}$ | $\begin{matrix} d_7 = 4.00 \\ d_8 = 18.94 \end{matrix}$ | $n_4 = 1.49383$ |
| F | $\begin{cases} r_9 = \infty \\ r_{10} = -2350.000 \end{cases}$ | $d_9 = 11.30$ | $n_5 = 1.50701$ |

Coefficients of aspheric surface

| | K | AD | AE | AF | AG |
|---|---|---|---|---|---|
| 1st. surface: | $-1.05058 \times 10^2$ | $-2.14658 \times 10^{-9}$ | $3.96503 \times 10^{-13}$ | $-1.36503 \times 10^{-18}$ | $4.71382 \times 10^{-20}$ |
| 2nd. surface: | $1.71773 \times 10^2$ | $6.03050 \times 10^{-8}$ | $2.13650 \times 10^{-11}$ | $-4.58825 \times 10^{-15}$ | $3.19582 \times 10^{-19}$ |
| 3rd. surface: | $-9.94130 \times 10^{-1}$ | $-5.0879 \times 10^{-8}$ | $2.23594 \times 10^{-11}$ | $-1.49012 \times 10^{-14}$ | $4.30992 \times 10^{-18}$ |
| 4th. surface: | $-1.01450 \times 10^3$ | $5.56705 \times 10^{-7}$ | $5.86500 \times 10^{-12}$ | $5.43570 \times 10^{-15}$ | $2.10615 \times 10^{-18}$ |
| 7th. surface: | $-1.62178 \times 10^{-1}$ | $-5.00570 \times 10^{-6}$ | $3.29928 \times 10^{-9}$ | $-1.78049 \times 10^{-12}$ | $2.84150 \times 10^{-16}$ |
| 8th. surface: | $-1.53904 \times 10^3$ | $-1.39105 \times 10^{-6}$ | $1.11090 \times 10^{-9}$ | $-3.55644 \times 10^{-13}$ | $4.53993 \times 10^{-17}$ | where: $r_1, r_2, r_3, \ldots$ are radii of curvature of successive surfaces of successive lens elements from the screen end; $d_1, d_2, d_3, \ldots$ are center thicknesses of the lens elements and distances therebetween; $n_1, n_2, n_3, \ldots$ are refractive indexes for a wave length $\lambda = 546$ nm of the lens elements; and F denotes a face plate of the CRT, wherein each aspheric surface is expressed in a Cartesian coordinate system having X axis in a direction of optical axis and Y axis perpendicular to X axis, as follows:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, AD, AE, AF and AG are constants.

17. A projection lens according to claim 1, substantially described as follows:

| | focal length 106.287 mm, aperature ratio 1:1.15, magnification −0.13, semi-field angle 28.9° | | |
|---|---|---|---|
| 1st. unit | $\begin{cases} r_1 = 5140.170 \\ r_2 = 858.704 \end{cases}$ | $\begin{matrix} d_1 = 7.00 \\ d_2 = 120.00 \end{matrix}$ | $n_1 = 1.49383$ |
| 2nd. unit | $\begin{cases} r_3 = 69.308 \\ r_4 = 961.584 \\ r_5 = 355.946 \\ r_6 = -187.109 \end{cases}$ | $\begin{matrix} d_3 = 24.22 \\ d_4 = 8.77 \\ d_5 = 15.40 \\ d_6 = 62.81 \end{matrix}$ | $\begin{matrix} n_2 = 1.49383 \\ \\ n_3 = 1.59143 \end{matrix}$ |
| 3rd. unit | $\begin{cases} r_7 = -60.000 \\ r_8 = 4498.121 \end{cases}$ | $\begin{matrix} d_7 = 4.00 \\ d_8 = 18.60 \end{matrix}$ | $n_4 = 1.49383$ |
| F | $\begin{cases} r_9 = \infty \\ r_{10} = -2350.000 \end{cases}$ | $d_9 = 11.30$ | $n_5 = 1.50701$ |

Coefficients of aspheric surface

| | K | AD | AE | AF | AG |
|---|---|---|---|---|---|
| 1st. surface: | $-7.64965 \times 10^4$ | $2.899526 \times 10^{-8}$ | $7.30268 \times 10^{-12}$ | $-1.18634 \times 10^{-15}$ | $3.15567 \times 10^{-20}$ |
| 2nd. surface: | $9.99223 \times 10^1$ | $7.95969 \times 10^{-8}$ | $3.56754 \times 10^{-11}$ | $-7.05636 \times 10^{-15}$ | $7.57821 \times 10^{-19}$ |
| 3rd. surface: | $-1.51018 \times 10^{-1}$ | $-5.85677 \times 10^{-8}$ | $1.78349 \times 10^{-11}$ | $-1.42113 \times 10^{-14}$ | $2.87506 \times 10^{-18}$ |
| 4th. surface: | $-1.01450 \times 10^2$ | $5.14373 \times 10^{-7}$ | $5.08680 \times 10^{-11}$ | $-2.10352 \times 10^{-15}$ | $2.43371 \times 10^{-18}$ |
| 7th. surface: | $1.72768 \times 10^{-1}$ | $-3.46249 \times 10^{-6}$ | $2.11443 \times 10^{-9}$ | $-1.03361 \times 10^{-12}$ | $9.83104 \times 10^{-17}$ |
| 8th. surface: | $0.0$ | $-1.11968 \times 10^{-6}$ | $8.40665 \times 10^{-10}$ | $-2.75243 \times 10^{-13}$ | $3.50564 \times 10^{-17}$ | where: $r_1, r_2, r_3, \ldots$ are radii of curvature of successive surfaces of successive lens elements from the screen end; $d_1, d_2, d_3, \ldots$ are center thicknesses of the lens elements and distances therebetween; $n_1, n_2, n_3, \ldots$ are refractive indexes for a wave length $\lambda=546$ nm of the lens elements; and F denotes a face plate of the CRT, wherein each aspheric surface is expressed in a Cartesian coordinate system having X axis in a direction of optical axis and Y axis perpendicular to X axis, as follows:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, AD, AE, AF and AG are constants.

18. A projection lens according to claim 1, substantially described as follows:

where: $r_1, r_2, r_3, \ldots$ are radii of curvature of successive surfaces of successive lens elements from the screen end; $d_1, d_2, d_3, \ldots$ are center thicknesses of the lens elements and distances therebetween; $n_1, n_2, n_3, \ldots$ are refractive indexes for a wave length $\lambda=546$ nm of the lens elements; and F denotes a face plate of the CRT, wherein each aspheric surface is expressed in a Cartesian coordinate system having X axis in a direction of optical axis and Y axis perpendicular to X axis, as follows:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, AD, AE, AF and AG are constants.

19. A projection lens according to claim 1, substantially described as follows:

focal length 107.947 mm,
aperture ratio 1:1.15,
magnification $-0.13$,
semi-field angle 28.9°

| | | | |
|---|---|---|---|
| 1st. unit | $r_1 = -16398.100$ | $d_1 = 5.00$ | $n_1 = 1.49383$ |
| | $r_2 = 11.37.444$ | $d_2 = 112.00$ | |
| 2nd. unit | $r_3 = 66.306$ | $d_3 = 25.70$ | $n_2 = 1.49383$ |
| | $r_4 = 862.016$ | $d_4 = 11.15$ | |
| | $r_5 = 244.021$ | $d_5 = 13.79$ | $n_3 = 1.59143$ |
| | $r_6 = -216.833$ | $d_6 = 52.71$ | |
| 3rd. unit | $r_7 = -55.657$ | $d_7 = 4.00$ | $n_4 = 1.49383$ |
| | $r_8 = 2160.371$ | $d_8 = 24.97$ | |
| F | $r_9 = \infty$ | $d_9 = 11.30$ | $n_5 = 1.50701$ |
| | $r_{10} = -2350.000$ | | |

Coefficients of aspheric surface

| K | AD | AE | AF | AG |
|---|---|---|---|---|
| 1st. surface: $1.94862 \times 10^4$ | $-8.92777 \times 10^{-9}$ | $1.24915 \times 10^{-12}$ | $-1.63183 \times 10^{-15}$ | $7.66087 \times 10^{-20}$ |
| 2nd. surface: $1.71830 \times 10^2$ | $8.53453 \times 10^{-8}$ | $1.90773 \times 10^{-11}$ | $-4.03086 \times 10^{-18}$ | $3.42392 \times 10^{-19}$ |
| 3rd. surface: $-9.94145 \times 10^{-2}$ | $-1.25388 \times 10^{-7}$ | $3.58961 \times 10^{-11}$ | $-1.61421 \times 10^{-14}$ | $2.25431 \times 10^{-18}$ |
| 4th. surface: $-1.01450 \times 10^3$ | $5.12807 \times 10^{-7}$ | $2.09090 \times 10^{-13}$ | $3.33912 \times 10^{-15}$ | $2.10826 \times 10^{-18}$ |
| 7th. surface: $-1.62640 \times 10^{-1}$ | $-1.68723 \times 10^{-8}$ | $2.97716 \times 10^{-9}$ | $-1.72839 \times 10^{-12}$ | $2.25205 \times 10^{-16}$ |
| 8th. surface: $-1.53904 \times 10^3$ | $-6.93351 \times 10^{-7}$ | $9.27006 \times 10^{-10}$ | $-3.94031 \times 10^{-13}$ | $6.08675 \times 10^{-17}$ | focal length 106.333 mm,
aperture ratio 1:1.15,
magnification $-0.13$,
semi-field angle 28.9°

| | | | |
|---|---|---|---|
| 1st. unit | $r_1 = -22696.200$ | $d_1 = 8.40$ | $n_1 = 1.49383$ |
| | $r_2 = 1098.573$ | $d_2 = 112.00$ | |
| 2nd. unit | $r_3 = 65.411$ | $d_3 = 24.91$ | $n_2 = 1.49383$ |
| | $r_4 = 931.499$ | $d_4 = 7.70$ | |
| | $r_5 = 347.000$ | $d_5 = 14.00$ | $n_3 = 1.59143$ |
| | $r_6 = -198.394$ | $d_6 = 58.61$ | |
| 3rd. unit | $r_7 = -56.708$ | $d_4 = 4.00$ | $n_4 = 1.49383$ |
| | $r_8 = 2024.267$ | $d_8 = 21.17$ | |
| F | $r_9 = \infty$ | $d_9 = 11.30$ | $n_5 = 1.50701$ |
| | $r_{10} = -3350.000$ | | |

Coefficient of aspheric surface

| K | AD | AE | AF | AG |
|---|---|---|---|---|
| 1st. surface: $5.79455 \times 10^4$ | $-8.19619 \times 10^{-9}$ | $2.79437 \times 10^{-11}$ | $-1.46662 \times 10^{-15}$ | $3.73496 \times 10^{-20}$ |
| 2nd. surface: $1.71830 \times 10^2$ | $7.84608 \times 10^{-8}$ | $2.02139 \times 10^{-11}$ | $-4.49600 \times 10^{-15}$ | $3.38235 \times 10^{-19}$ |
| 3rd. surface: $-9.94145 \times 10^{-2}$ | $-1.30086 \times 10^{-7}$ | $2.53125 \times 10^{-11}$ | $-1.72662 \times 10^{-14}$ | $2.53377 \times 10^{-18}$ |
| 4th. surface: $-1.01450 \times 10^3$ | $5.34556 \times 10^{-7}$ | $-2.62827 \times 10^{-11}$ | $2.29229 \times 10^{-15}$ | $2.42110 \times 10^{-18}$ |
| 7th. surface: $-1.62640 \times 10^{-1}$ | $-4.30942 \times 10^{-6}$ | $3.06271 \times 10^{-9}$ | $-1.86265 \times 10^{-12}$ | $2.21247 \times 10^{-16}$ |

-continued

| | | | | |
|---|---|---|---|---|
| 8th. surface: $-1.53904 \times 10^5$ | $-9.26936 \times 10^{-7}$ | $8.96134 \times 10^{-10}$ | $-3.61631 \times 10^{-13}$ | $5.35283 \times 10^{-17}$ | where $r_1, r_2, r_3, \ldots$ are radii of curvature of successive surfaces of successive lens elements from the screen end; $d_1, d_2, d_3, \ldots$ are center thicknesses of the lens elements and distances therebetween; $n_1, n_2, n_3, \ldots$ are refractive indexes for a wave length $\lambda=546$ nm of the lens elements; and F denotes a face plate of the CRT,
wherein each aspheric surface is expressed in a Cartesian coordinate system having X axis in a direction of optical axis and Y axis perpendicular to X axis, as follows:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, AD, AE, AF and AG are constants.

20. A projection lens according to claim 1, substantially described as follows:

| | focal length 109.777 mm, aperture ratio 1:1.15, magnification −0.13, semi-field angle 28.9° | | |
|---|---|---|---|
| 1st. unit | $r_1 = -6624.967$ | $d_1 = 9.00$ | $n_1 = 1.49383$ |
| | $r_2 = 1295.518$ | $d_2 = 112.00$ | |
| | $r_3 = 67.550$ | $d_3 = 76.67$ | $n_2 = 1.49383$ |
| 2nd. unit | $r_4 = 700.262$ | $d_4 = 38.17$ | |
| | $r_5 = 132.267$ | $d_5 = 13.70$ | $n_3 = 1.59143$ |
| | $r_6 = \infty$ | $d_6 = 40.56$ | |
| 3rd. unit | $r_7 = -54.823$ | $d_7 = 4.00$ | $n_4 = 1.49383$ |
| | $r_8 = -844.766$ | $d_8 = 26.99$ | |
| F | $r_9 = \infty$ | $d_9 = 11.30$ | $n_5 = 1.50701$ |
| | $r_{10} = -2350.000$ | | |

Coefficients of aspheric surface

| K | AD | AE | AF | AG |
|---|---|---|---|---|
| 1st. surface: $6.17611 \times 10^1$ | $-5.29692 \times 10^{-8}$ | $-4.16941 \times 10^{-12}$ | $-3.52947 \times 10^{-18}$ | $1.45964 \times 10^{-19}$ |
| 2nd. surface: $1.71830 \times 10^2$ | $1.49753 \times 10^{-8}$ | $4.54237 \times 10^{-12}$ | $-3.92648 \times 10^{-19}$ | $2.01987 \times 10^{-19}$ |
| 3rd. surface: $-9.94145 \times 10^{-1}$ | $-9.15636 \times 10^{-8}$ | $3.44734 \times 10^{-11}$ | $-1.58656 \times 10^{-14}$ | $7.09830 \times 10^{-19}$ |
| 4th. surface: $-1.01450 \times 10^3$ | $4.06665 \times 10^{-7}$ | $-2.75475 \times 10^{-11}$ | $-5.21818 \times 10^{-15}$ | $2.03138 \times 10^{-18}$ |
| 7th. surface: $-1.62640 \times 10^{-1}$ | $-3.19564 \times 10^{-6}$ | $2.35554 \times 10^{-9}$ | $-1.29078 \times 10^{-11}$ | $2.66089 \times 10^{-18}$ |
| 8th. surface: $-1.53904 \times 10^9$ | $-8.33234 \times 10^{-7}$ | $1.08978 \times 10^{-9}$ | $-4.28388 \times 10^{-11}$ | $6.10697 \times 10^{-17}$ | where: $r_1, r_2, r_3, \ldots$ are radii of curvature of successive surfaces of successive lens elements from the screen end; $d_1, d_2, d_3, \ldots$ are center thicknesses of the lens elements and distances therebetween; $n_1, n_2, n_3, \ldots$ are refractive indexes for a wave length $\lambda=546$ nm of the lens elements; and F denotes a face point of the CRT,
wherein each aspheric surface is expressed in a Cartesian coordinate system having X axis in a direction of optical axis and Y axis perpendicular to X axis, as follows:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, AD, AE, AF and AG are constants.

* * * * *